United States Patent
Hesl

(10) Patent No.: US 8,281,906 B2
(45) Date of Patent: Oct. 9, 2012

(54) BRAKING APPARATUS

(75) Inventor: Stefan Hesl, Eschenbach (DE)

(73) Assignee: Siemens Aktiengesellschaft, Munich (DE)

( * ) Notice: Subject to any disclaimer, the term of this patent is extended or adjusted under 35 U.S.C. 154(b) by 457 days.

(21) Appl. No.: 12/471,010

(22) Filed: May 22, 2009

(65) Prior Publication Data

US 2009/0294223 A1    Dec. 3, 2009

(30) Foreign Application Priority Data

May 30, 2008   (DE) .......................... 10 2008 025 941

(51) Int. Cl.
*B60L 7/00* (2006.01)
(52) U.S. Cl. ....................................... 188/165; 188/171
(58) Field of Classification Search ................. 188/41, 188/42, 165, 171
See application file for complete search history.

(56) References Cited

U.S. PATENT DOCUMENTS

| | | | | |
|---|---|---|---|---|
| 3,096,854 | A * | 7/1963 | Price et al. ................. | 188/42 |
| 4,805,740 | A * | 2/1989 | Wilke et al. ................ | 188/173 |
| 5,671,829 | A * | 9/1997 | Rivera ....................... | 188/171 |
| 6,131,704 | A * | 10/2000 | Viita-Aho et al. .......... | 188/44 |
| 7,007,779 | B2 * | 3/2006 | Johansson et al. .......... | 188/161 |
| 7,080,717 | B2 | 7/2006 | Ito | |

FOREIGN PATENT DOCUMENTS

| | | |
|---|---|---|
| DE | 1 575 989 A1 | 1/1970 |
| DE | 197 37 120 A1 | 3/1999 |
| DE | 199 102 89 A1 | 9/2000 |
| DE | 199 57 939 A1 | 5/2001 |
| DE | 100 09 331 C2 | 10/2002 |
| DE | 101 27 664 C1 | 4/2003 |
| DE | 10 2005 035 169 A1 | 3/2006 |
| WO | WO 2004/052207 A1 | 6/2004 |

OTHER PUBLICATIONS

German Office Action dated Apr. 3, 2009 for DE 10 2008 025 941.1 with English translation.
http://de.wikipedia.org/wik/Magnetschienenbremse, Magnetschienenbremse.

* cited by examiner

*Primary Examiner* — Robert A Siconolfi
*Assistant Examiner* — Stephen Bowes
(74) *Attorney, Agent, or Firm* — Lempia Summerfield Katz LLC

(57) ABSTRACT

The present embodiments relate to a braking apparatus, in particular for slowing down a carriage, with a brake pad, which is formed using a magnetic material, at least one first spring to press the brake pad onto a surface for the purposes of braking and an electromagnet. The brake pad, the at least one first spring and the electromagnet are disposed and embodied in such a manner that when current flows through the electromagnet a force acts on the brake pad by way of the magnetic material, compensating for the action of the at least one first spring on the brake pad in such a manner that the brake pad assumes a position, in which braking cannot take place due to the pressure of the brake pad. The braking apparatus allows braking independently of the material characteristics of the environment in which the braking apparatus is deployed.

13 Claims, 2 Drawing Sheets

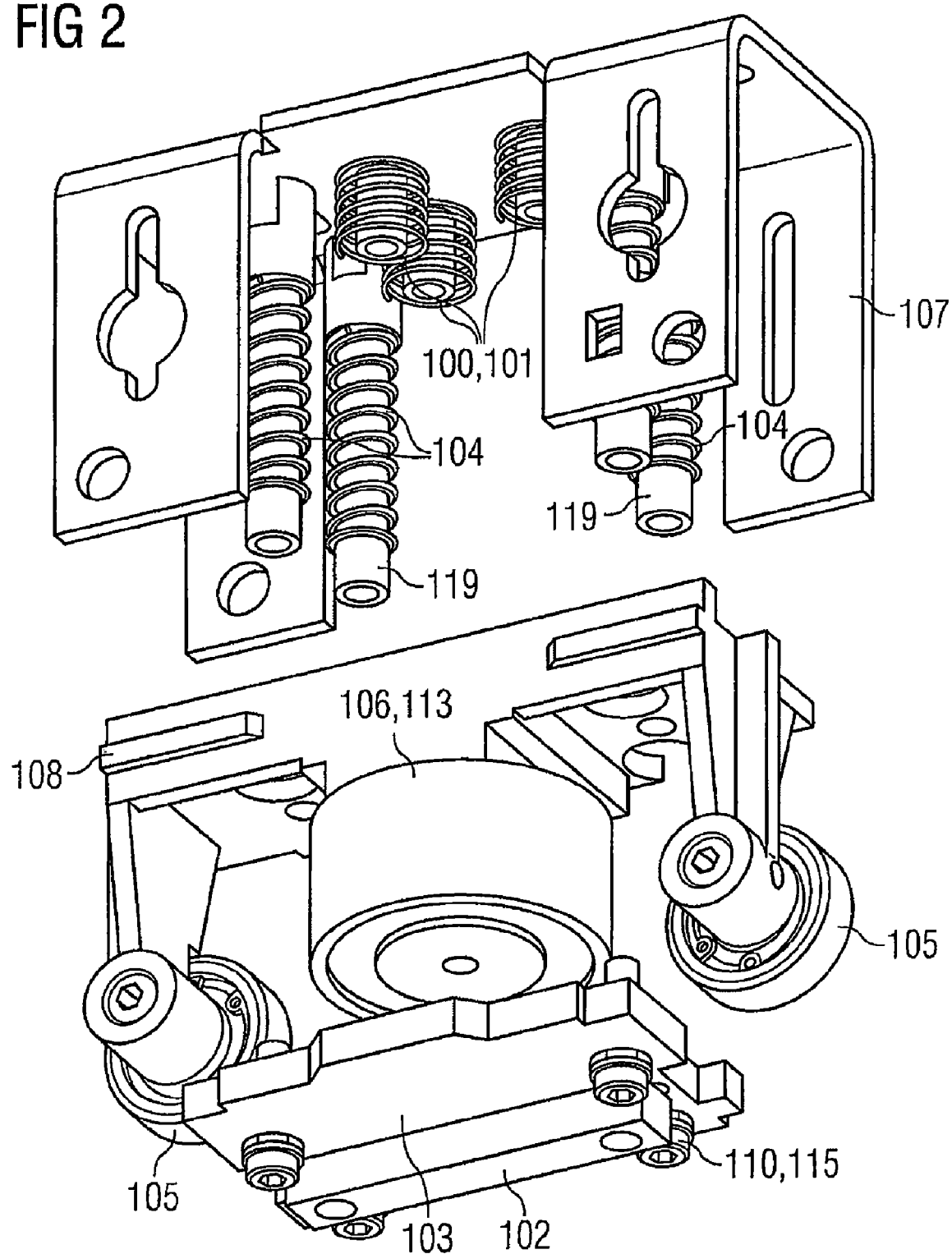

BRAKING APPARATUS

This patent document claims the benefit of DE 10 2008 025 941.1 filed May 30, 2008, which is hereby incorporated by reference.

BACKGROUND

The present embodiments relate to a braking apparatus (device), in particular for slowing down a carriage.

Technical facilities (devices) may be secured to the ceiling of a room to provide for economical use of existing space. For more flexible deployment of devices suspended from the ceiling, longitudinal ceiling rails with carriages may be used to provide displacement or movement of the technical device secured to the carriage. Technical devices suspended from the ceiling may be found in factories and in hospitals, where medical diagnosis devices are secured in such a manner. For example, EP 1569557 A1 discloses an x-ray ceiling gantry with an x-ray device that can be moved along a longitudinal ceiling rail.

DE 19910289 A1 discloses a ceiling gantry, which includes a ceiling transporter for transporting an operating table top. The ceiling transporter is moved along rails attached to the ceiling by a carriage. The ceiling transporter is slowed down by magnetic brakes or magnetic rail brakes. The mode of operation of a magnetic rail brake is described in the German Wikipedia entry (http://de.wikipedia.org/wiki/Magnetschienenbremse). The magnetic rail brake generally includes iron contact shoes (pads) with built in electromagnets. When current flows through the electromagnet, the contact shoes are drawn to the rails. A braking friction force results.

For the mode of operation of the magnetic rail brakes it is necessary for the rails to be made at least partially of metal, to allow the operation of the magnetic rail brakes

SUMMARY AND DESCRIPTION

The present embodiments may obviate one or more of the drawbacks or limitations inherent in the related art. For example, in one embodiment, a carriage with a magnetic braking mechanism is provided. The magnetic braking mechanism operates independently of the rail material.

The slowing action of the carriage is effected by a spring force and that compensation for the spring force is provided by a magnetic force, when no braking operation is taking place. When braking takes place, the magnetic force can be canceled (for example, by interrupting the power supply to an electromagnet), so that the spring force deploys a braking action.

Braking operates independently of the material characteristics of the environment in which the braking apparatus is deployed. As a result, magnetic rails are not required for a carriage during use.

The braking apparatus is formed with a brake pad, which includes a magnetic material. The braking apparatus has at least one first spring to press the brake pad onto a surface for the purposes of braking. The braking apparatus also includes an electromagnet. The brake pad, the at least one first spring, and the electromagnet are disposed and embodied in such a manner that when current flows through the electromagnet, a force acts on the brake pad by way of the magnetic material, compensating for the action of the at least one first spring on the brake pad in such a manner that the brake pad assumes a position in which braking cannot take place due to the pressure of the brake pad. In this position (movement position) the brake pad is attracted to the magnet and rests directly against it.

The braking apparatus can be used, for example, to brake a carriage. The braking apparatus may include rollers to run on rails. In one embodiment, the braking apparatus comprises a carrier part, to which the magnet is secured. The carrier part may include legs, at the ends of which the rollers are disposed. The fact that the magnet and rollers are attached to the same component, namely the carrier part, ensures that there is a constant distance (brake clearance) between the rollers and the rails on which the rollers run and the brake pad in the movement position. The constant distance is independent of the rails. Any deformations of the rails have no influence on the distance between the brake pad in the movement position and the rails. This configuration of the braking apparatus is robust in respect of the form and any deformations of rails used. The distance may be adjusted, so that it is possible to respond to the form and profile of the rails (e.g. curves) by suitable setting of the distance.

For use with a carriage it is also advantageous if at least one second spring is present to press the rollers onto the rails, with the spring force of the at least second roller being less than that of the at least first spring.

Further advantageous embodiments are contained in the claims and the exemplary embodiment.

BRIEF DESCRIPTION OF THE DRAWINGS

FIG. 2 shows an exploded diagram of one embodiment of a braking apparatus.

DETAILED DESCRIPTION

Figure 1:
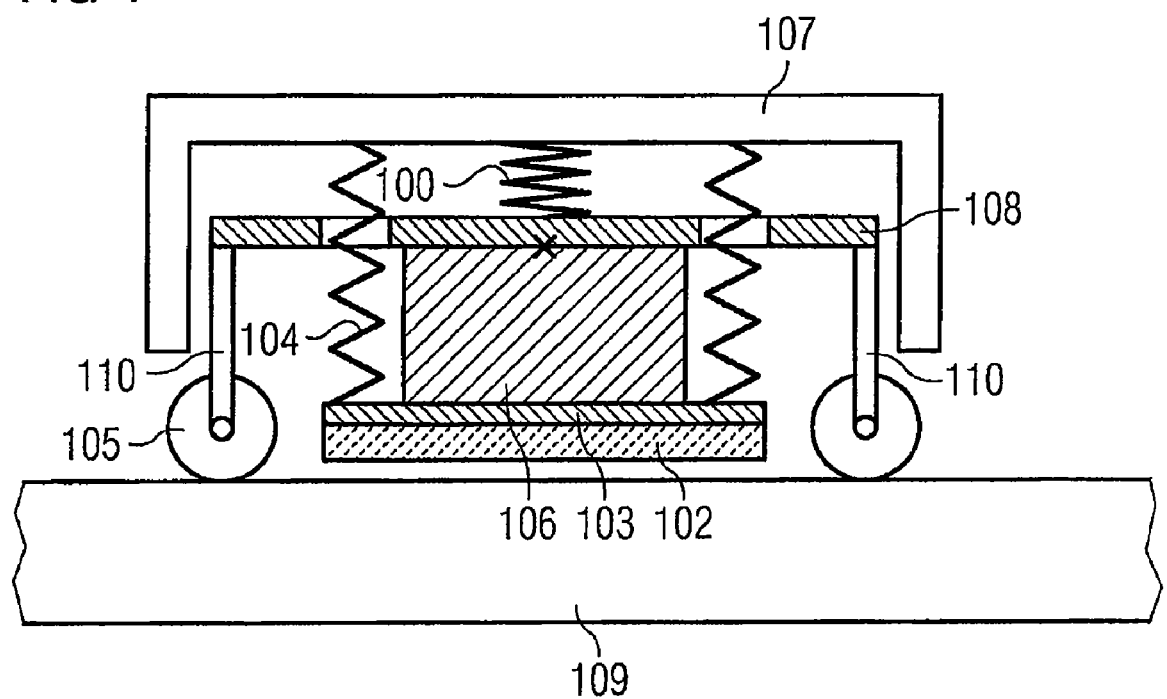
FIG. 1 shows a schematic diagram of one embodiment of a braking apparatus.

FIG. 1 shows a braking apparatus or brake module, hereafter also referred to as a brake carriage. Springs 100, 104 are secured to a support or frame part 107. The support part 107 is used for securing to an object to be braked, for example, a carriage. This support part 107 is a fixed part of the braking apparatus in that the vertical position is fixed during the braking operation. The support part 107 is secured to a carrier part 108 with the aid of the springs 100 to absorb or equalize irregularities. This carrier part 108 holds an electromagnet 106. The carrier part 108 is also embodied to roll on rails or guide runners 109 and is provided with rollers 105 for this purpose. The carrier part has legs 110, which support the rollers 105. The braking apparatus includes a brake pad 102 for braking by pressing the pad onto the surface of the rails 109. At the rear, i.e., on the side facing away from the surface, the brake pad 102 is provided with a magnetic plate 103. "Magnetic plate" includes a plate that is formed using a magnetic material, i.e. a material on which an attraction force is exercised by a magnet. The powerful springs 104 secured to the carrier part 108 acts on the magnetic plate. The spring strength is selected according to the braking force required, for example, 400 N to slow down a carriage. The term "powerful" relates to the fact that the spring force of the springs 104 is sufficiently powerful to ensure effective braking and that further springs 100 are provided, the spring force of which is weaker (generally, much weaker). These further springs 100—hereafter referred to as "weak springs"—serve to press the brake carriage or more precisely the carrier part 108 onto the rails 109. This absorbs or compensates for any irregularities of the rails 109, thereby ensuring more silent or smooth conveyance of devices (e.g. a ceiling-mounted x-ray device)

secured to the brake carriage. A value for the spring force might be 50 N for a spring force of 400 N of the powerful springs 104. The distance between the rails 109 and the brake pad 102 can be adjusted by changing the height of the carrier part 108 by an eccentric movement. In the movement position, the distance between the rails 109 and the brake pad 102 always remains constant, as the rollers 109 and electromagnet 106 are both secured or attached to the carrier part 108. The carrier part 108 is provided with legs 110, the ends of which support rollers 110. Changing the position of the rollers 109 on the legs 110 of the carrier part 108 sets the distance or brake clearance.

FIG. 2 shows an exploded diagram of a braking apparatus or brake module. The weak springs 100 and the powerful springs 104 are disposed respectively around support elements 101 and/or 119 in the form of hollow cylinders. These support elements prevent deformation or bending of the springs. Pins and/or bolts may be inserted into the support elements from below to lie flush. The support elements 101 fix the support part 107 on the carrier part 108 in a horizontal direction. In a vertical direction the absorption allows some play in respect of the relative movement of the support part 107 and carrier part 108, thereby reducing the load on the support part 107 that occurs during the braking process. Pins and/or bolts 110 secured to the plate 103 can be inserted into the hollow cylinders of the support elements of the powerful springs 119 from below. While the magnet is supplied with current, the bolts 110 projecting and/or inserted into the hollow cylinders of the support elements 119 fix the brake pad 102 in a horizontal direction. The pad 102 is held by the magnet 106 in a vertical direction. The brake pad 102 is guided through the support part 107 in a horizontal direction.

The powerful springs 104 are configured in such a manner that when the attraction force of the magnet 106 does not compensate, the brake pad 102 is pressed against the rails 109 and a braking action is deployed. When current is present the attraction force of the magnet 106 compensates for the spring force of the powerful springs 104 in such a manner that there is no contact between the brake pad and the rails 109.

During a braking operation the power supply to the electromagnet 106 is interrupted. There is then no compensation for the powerful spring force and the brake pad is pressed onto the rails 109. The friction force causes the brake module and therefore also any carriage provided with the brake module to slow down. The support elements 101 and the associated bolts 110 are formed in such a manner that when the pad is pressed onto the rails 109 a region of the bolt 110 remains in the cavity of the support elements 119 in each instance. FIG. 2 shows that the carrier part has tailored cutouts for the passage of the support elements 119.

The invention is not restricted to this exemplary embodiment. It is immediately clear to the person skilled in the art that the concept underlying the invention permits other embodiments, in particular in respect of the arrangement of the individual elements.

The invention claimed is:

1. A braking apparatus for slowing down a carriage, the braking apparatus comprising:
    a brake pad formed at least partially using a magnetic material,
    a plurality of first springs configured to press the brake pad onto a surface for the purposes of braking,
    an electromagnet,
    a carrier part, the electromagnet being secured to the carrier part,
    a support part comprising hollow support elements, the plurality of first springs extending from the support part to the brake pad,
    bolts secured to the brake pad, the bolts being inserted into the hollow support elements, and
    an active connection operable to transfer a braking action from he brake ad to the support part,
    wherein the brake pad, the plurality of first springs, and the electromagnet are disposed and configured such that when current flows through the electromagnet, a force acts on the brake pad by the magnetic material, compensating for the pressing of the plurality of first springs on the brake pad such that the brake pad assumes a position, in which braking cannot take place due to a pressure of the brake pad.

2. The braking apparatus as claimed in claim 1, wherein the magnetic material of the brake pad is in a segment formed using the magnetic material.

3. The braking apparatus as claimed in claim 2, wherein the segment is a plate disposed on a side of the brake pad facing the electromagnet.

4. The braking apparatus as claimed in claim 2, further comprising rollers configured for running on rails, the rollers being secured to the carrier part.

5. The braking apparatus as claimed in claim 1, further comprising rollers connected to the carrier part, the rollers being configured for running on rails.

6. The braking apparatus as claimed in claim 5, wherein the rollers are movable such that a distance between the brake pad and the rails when current is flowing through the electromagnet is adjustable.

7. The braking apparatus as claimed in claim 5, further comprising at least one second spring that is configured to press the rollers onto the rails, a spring force of the at least one second spring being less than a spring force of the plurality of first springs.

8. The braking apparatus as claimed in claim 7, wherein the at least one second spring is secured to the support part.

9. The braking apparatus as claimed in claim 8,
    wherein the carrier part has cutouts, each of the cutouts at least partially surrounding one of the hollow support elements.

10. The braking apparatus as claimed in claim 1, wherein the hollow support elements are surrounded with corresponding first springs of the plurality of first springs.

11. The braking apparatus as claimed in claim 1, wherein the carrier part includes cutouts for the hollow support elements, the cutouts at least partially surrounding the hollow support elements in a flush manner.

12. A movable carriage comprising a braking apparatus for slowing down the movable carriage, the braking apparatus comprising:
    a brake pad formed using a magnetic material,
    a plurality of springs configured to press the brake pad onto a surface for the purposes of braking,
    an electromagnet,
    a carrier part, the electromagnet being secured to the carrier part,
    a support part comprising hollow support elements extending through the plurality of springs,
    bolts secured to the brake pad, the bolts being inserted into the hollow support elements, and
    an active connection operable to transfer a braking action from the brake pad to the support part,
    wherein the brake pad, the plurality of springs, and the electromagnet are disposed and configured such that when current flows through the electromagnet, a force acts on the brake pad by the magnetic material, compensating for the pressing of the plurality of springs on the brake pad such that the brake pad assumes a position, in which braking cannot take place due to a pressure of the brake pad.

13. A movable carriage comprising a braking apparatus for slowing down the movable carriage, the braking apparatus comprising:

- a brake pad formed using a magnetic material,
- at least one first spring configured to press the brake pad onto a surface for the purposes of braking,
- an electromagnet,
- a carrier part, the electromagnet being secured to the carrier part,
- rollers connected to the carrier part, the rollers being operable to run on rails,
- at least one second spring that is configured to press the rollers onto the rails, a spring force of the at least one second spring being less than a spring force of the at least one first spring,
- a support part, the at least one second spring being secured to the support part, and
- at least one hollow support element secured to the support part and extending through the at least one first spring,
- wherein the brake pad, the at least one first spring, and the electromagnet are disposed and configured such that when current flows through the electromagnet, a force acts on the brake pad by the magnetic material, compensating for the pressing of the at least one first spring on the brake pad such that the brake pad assumes a position, in which braking cannot take place due to a pressure of the brake pad, and
- wherein the carrier part has at least one cutout that at least partially surrounds the at least one hollow support element.

* * * * *